(12) United States Patent  (10) Patent No.: US 8,573,667 B2
Inoue et al.  (45) Date of Patent: Nov. 5, 2013

(54) COVER STRUCTURE OF SADDLE RIDE TYPE VEHICLE

(75) Inventors: Yoshihiro Inoue, Saitama (JP); Masayuki Kinoshita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 304 days.

(21) Appl. No.: 13/041,823

(22) Filed: Mar. 7, 2011

(65) Prior Publication Data
US 2011/0221221 A1  Sep. 15, 2011

(30) Foreign Application Priority Data

Mar. 9, 2010  (JP) .................................. 2010-051936

(51) Int. Cl.
*B60R 5/04* (2006.01)
(52) U.S. Cl.
USPC ......................................................... 296/37.1
(58) Field of Classification Search
USPC .................. 296/37.1, 24.3; 180/219
See application file for complete search history.

(56) References Cited

U.S. PATENT DOCUMENTS

| 4,762,197 A  * | 8/1988 | Yamada et al. ............... 180/219 |
| 7,503,609 B2 | 3/2009 | Misaki et al. |
| 2006/0220406 A1* | 10/2006 | Misaki et al. ................ 296/37.1 |

FOREIGN PATENT DOCUMENTS

JP  2006-281948 A  10/2006

* cited by examiner

*Primary Examiner* — Joseph Pape
(74) *Attorney, Agent, or Firm* — Birch, Stewart, Kolasch & Birch, LLP

(57) ABSTRACT

To easily prevent flapping of a cover attached to a vehicle such as a motor cycle. A storage box is provided on a lateral side of a vehicle frame. The storage box includes a storage box main body having an opening facing an outside of a vehicle, and a lid member which is openable and closable to cover the opening. A side cover which covers a lateral side of the vehicle is provided in front of the storage box. A rear edge portion of the side cover extends to an outside edge portion of the storage box main body, and is fixed to the outside edge portion.

16 Claims, 8 Drawing Sheets ated Japanese on Mar. 9, 2010,

COVER STRUCTURE OF SADDLE RIDE TYPE VEHICLE

CROSS-REFERENCE TO RELATED APPLICATIONS

This application claims priority under 35 U.S.C. §119(a) to Application No. 2010-051936, filed in Japan on Mar. 9, 2010, the entirety of which is expressly incorporated herein by reference.

BACKGROUND OF THE INVENTION

1. Field of the Invention

The present invention relates to a cover structure of a saddle ride type vehicle including a storage box on a rear lateral side of the vehicle.

2. Description of Background Art

Some saddle ride type vehicles such as motorcycles each include a storage box made of a resin material or another material, and provided on a rear lateral side of the vehicle. Japanese Patent Application Publication No. 2006-281948, for example, discloses a motorcycle including storage boxes on the right and left sides in a vehicle rear part, the storage boxes each having a lid that is closable and openable to the outside of the vehicle. In this vehicle, a cover provided in front of each of the storage boxes is formed integrally with the storage box.

SUMMARY OF THE INVENTION

In the vehicle according to Japanese Patent Application Publication No. 2006-281948, the cover is formed integrally with the storage box to surround the storage box. The cover, however, may be formed separately from the storage box. In the latter case, a gap needs to be provided between the cover and the storage box in order to absorb assembling variations. Due to the presence of the gap, however, an edge portion of the cover may flap, or the cover and the storage box may easily hit each other and thereby be damaged in texture. The cover may be formed with a complicated structure to prevent such flapping of the cover, but the complicated structure, in turn, may degrade the appearance of the cover.

The present invention has been made in consideration of the aforementioned circumstances, and aims to provide a cover structure of a saddle ride type vehicle that is capable of keeping a cover disposed in front of a storage box in a saddle ride type vehicle from flapping, to prevent the cover and the storage box from hitting each other and thereby from being damaged in texture. In addition, the present invention aims to provide a cover structure of a saddle ride type vehicle that is capable of absorbing variations in assembling a cover and another adjacent component together, even while keeping the cover from flapping.

For the purpose of solving the above-mentioned problems, a first aspect of the present invention provides a storage box (such as a left trunk 23 in the embodiment) provided on a lateral side of a vehicle frame (such as a vehicle frame 4 in the embodiment) on a rear side of a vehicle (such as an motorcycle 1 in the embodiment), the storage box including a storage box main body (such as a trunk box main body 29 in the embodiment) having an opening (such as an opening 29A in the embodiment) facing an outside of the vehicle, and a lid member (such as a trunk open-close lid 30 in the embodiment) configured to be openable and closable to cover the opening; and a side cover (such as a rear side cover 20L in the embodiment) provided in front of the storage box, and configured to cover a vehicle body lateral side, wherein a rear edge portion (such as a rear edge portion 31 of the embodiment) of the side cover extends to an outermost outside surface (such as an outside edge portion 32 in the embodiment) of the storage box main body, and the rear edge portion of the side cover is fixed to the outermost outside surface of the storage box main body.

According to a second aspect of the present invention, an elongated hole grommet (such as a grommet 35 in the embodiment), having a length dimension in a front-rear direction of the vehicle, is provided in the outermost outside surface of the storage box main body, a boss portion (such as a boss portion 33 in the embodiment) is provided on an inner surface of the rear edge portion of the side cover, and the boss portion is engaged with the grommet.

According to a third aspect of the present invention, a fixing part, in which the rear edge portion of the side cover is fixed to the outermost outside surface of the storage box main body, is covered with the lid member when the lid member is completely closed.

According to a fourth aspect of the present invention, a front side cover (such as a side vehicle body cover 3L in the embodiment) is provided in front of the side cover, and a driver seat (such as a driver seat 18 in the embodiment) is provided above the front side cover.

According to a fifth aspect of the present invention, the boss portion of the side cover is inserted into the grommet from the outside to an inside in a vehicle width direction, and the rear edge portion of the side cover is covered with the lid member from the outside in the vehicle width direction.

According to the first aspect of the present invention, the rear edge portion of the side cover disposed in front of the storage box is fixed to the outermost outside surface of the storage box main body. Therefore, the rear edge portion of the side cover is kept from flapping, which consequently prevents the side cover and the storage box from hitting each other and from being damaged in texture.

According to the second aspect of the present invention, the grommet is the elongated hole, having a length dimension in the front-rear direction of the vehicle. Therefore, the grommet can absorb positioning variations in the front-rear direction during the assembly of the side cover and the storage box adjacent to each other.

According to the third aspect of the present invention, the rear edge portion of the side cover can be fixed with the lid member opened, and the fixing part is hid by closing the lid member. Therefore, the workability and appearance are improved. In addition, there is no concern that the side cover may fall off because the vehicle does not usually start to run when the lid is opened.

According to the fourth aspect of the present invention, even in the case where the side cover is surrounded from three sides by the front side cover, the storage box and the seat, the side cover can absorb variations in assembling of the other components.

According to the fifth aspect of the present invention, the boss portion is inserted from the outside toward the inside in the vehicle width direction. Therefore, the fixing part is not exposed to the outside even when not being covered with the lid member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
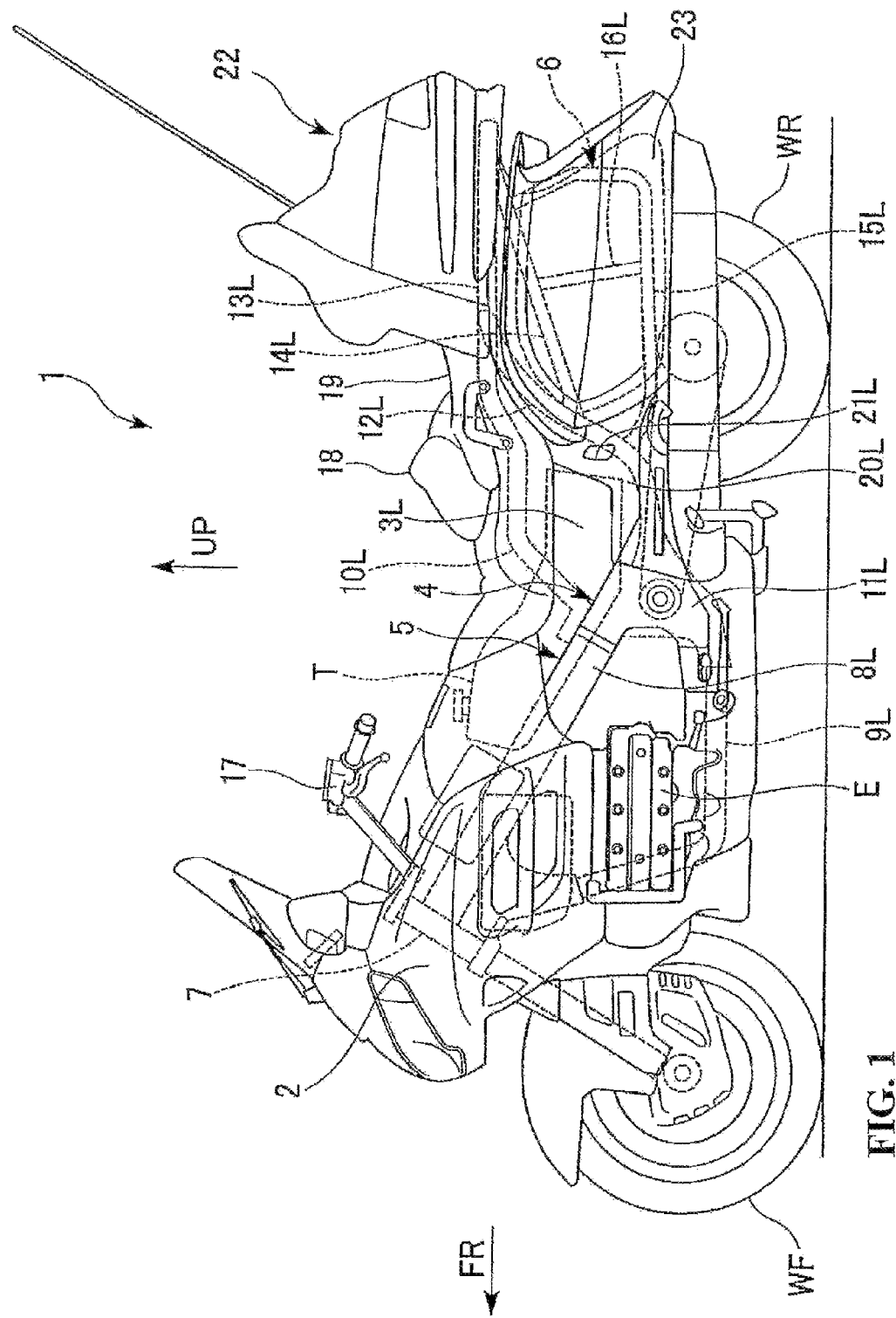
FIG. 1 is a side view of a motorcycle according to an embodiment of the present invention.

The present invention will now be described with reference to the accompanying drawings, wherein the same reference numerals have been used to identify the same or similar elements throughout the several views.

FIG. 1 shows a motorcycle 1 to which the present invention is applied. The motorcycle 1 includes an engine E between front and rear wheels WF, WR. In the motorcycle 1, a front side of a vehicle body is covered with a front vehicle body cover 2, and left and right sides of the vehicle body are covered with side vehicle body covers 3L, 3R (FIG. 1 shows only the side vehicle body cover 3L on the face side of the drawing). It should be noted that, in the drawings, an arrow FR shows the front side of the vehicle, an arrow UP shows the upper side of the vehicle, and an arrow LH shows the left-hand side of the vehicle.

A vehicle body frame 4 forming a base frame of the vehicle body of the motorcycle 1 includes a main vehicle body frame 5 and a rear vehicle body frame 6. The main vehicle body frame 5 includes a head pipe 7. A pair of left and right main frames 8L, 8R extend continuously from the head pipe 7 downwardly rearward of the vehicle body. A pair of left and right down frames 9L, 9R extend downward from the head pipe 7 and then extend rearward of the vehicle body. Seat rails 10L, 10R extend continuously from rear ends of the main frames 8L, 8R rearward of the vehicle body. A pair of left and right center frames 11L, 11R extend continuously from the down frames 9L, 9R and the seat rails 10L, 10R. Sub frames 12L, 12R extend upwardly rearward from lower parts of the center frames 11L, 11R and are coupled to rear end portions of the seat rails 10L, 10R, respectively.

The rear vehicle body frame 6 includes a pair of left and right upper pipes 13L, 13R extending rearward from the rear end portions of the seat rails 10L, 10R. A pair of left and right tilted pipes 14L, 14R extend upwardly rearward from approximately vertical center portions of the sub frames 12L, 12R, rear end portions of the tilted pipes 14L, 14R being coupled to rear end portions of the upper pipes 13L, 13R. Lower pipes 15L, 15R extend rearward from lower portions of the sub frames 12L, 12R and then extend upward to be coupled to the tilted pipes 14L, 14R. Vertical pipes 16L, 16R are laid between the tilted pipes 14L, 14R and the lower pipes 15L, 15R, respectively. Incidentally, FIG. 1 shows only the main frame 8L, the down frame 9L, the seat rail 10L, the center frame 11L, and the sub frame 12L of the main vehicle body frame 5 on the face side in the drawing, and also shows only the upper pipe 13L, the tilted pipe 14L, the lower pipe 15L, and the vertical pipe 16L of the rear vehicle body frame 6 on the face side in the drawing.

In the main vehicle body frame 5, a steering system is rotatably supported by the head pipe 7. Reference numeral 17 represents a handle bar included in the steering system. In addition, a fuel tank T is placed on top of the main frames 8L, 8R. A driver seat (front seat) 18 and a passenger seat (rear seat) 19 are placed adjacently in a front-rear direction on top of the seat rails 10L, 10R behind the fuel tank T.

The engine E is mounted below the fuel tank T, and between the main frames 8L, 8R and the down frames 9L, 9R. The side vehicle body covers 3L, 3R are provided between the driver seat 18 and the main frames 8L, 8R. Side surfaces of the side vehicle body covers 3L, 3R are provided to be substantially flush with side surfaces of the main frames 8L, 8R and to be also substantially flush with side surfaces of the driver seat 18.

Figure 2:
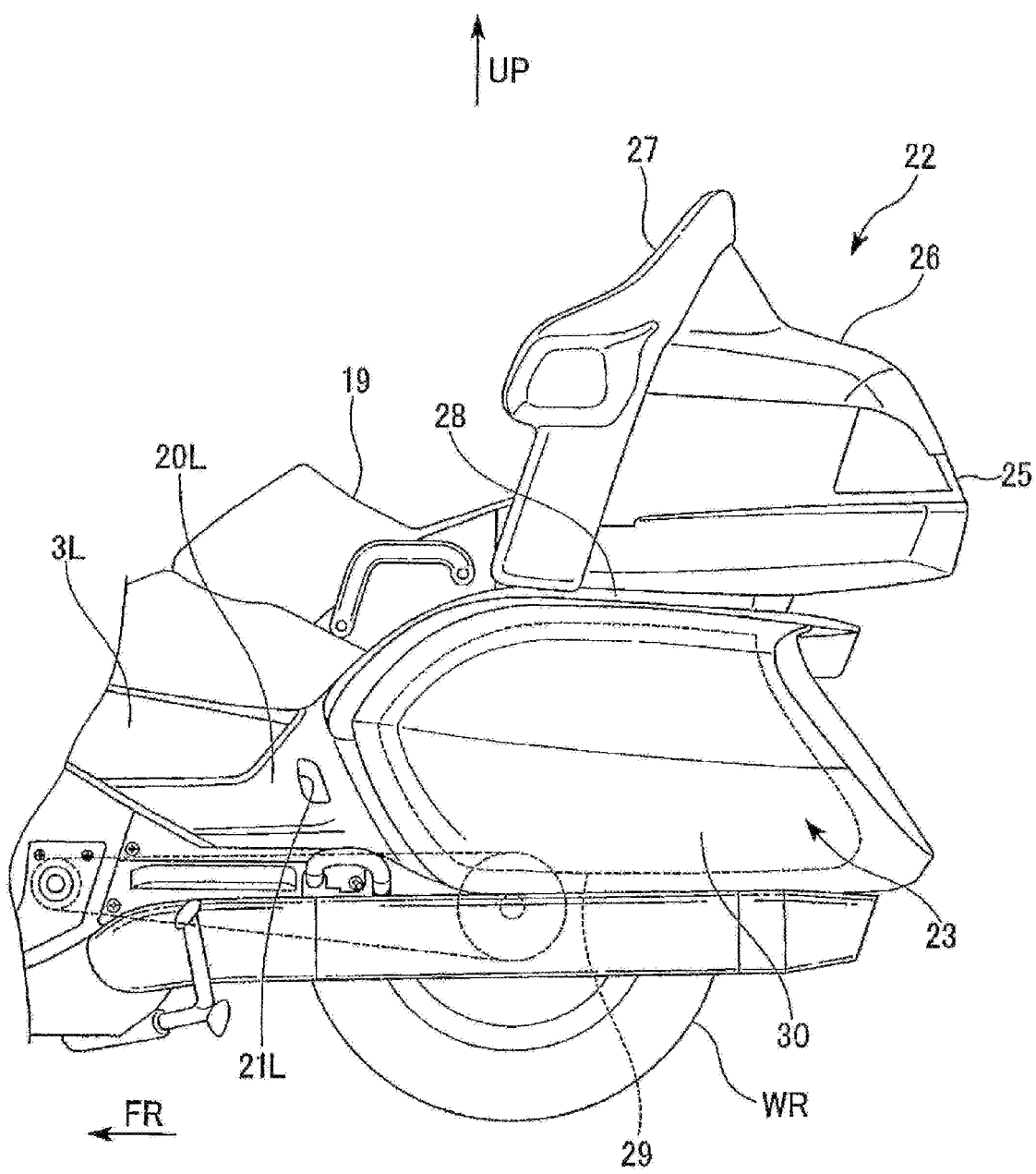
FIG. 2 is a side view of a vehicle rear part.

FIG. 2 shows an enlarged view of a vehicle rear part. Rear side covers 20L, 20R (only the rear side cover 20L on the face side of the drawing is shown) are provided behind the side vehicle body covers 3L, 3R, respectively. The rear side covers 20L, 20R extend rearward smoothly from rear portions of the side vehicle body covers 3L, 3R. Vent holes 21L, 21R (only the vent hole 21L on the face side of the drawing is shown), opened to the outside in a vehicle width direction, are formed in the rear side covers 20L, 20R, respectively. The vent holes 21L, 21R are in communication with a wheelhouse or wheel well of the rear wheel WR so as to let an introduced traveling wind into the wheel well.

A center trunk 22 is provided behind the passenger seat 19. A left trunk 23 and a right trunk 24 are provided respectively on the left and right sides below the center trunk 22 behind the rear side covers 20L, 20R (only the left trunk 23 on the face side of FIG. 1 is shown). Left and right side portions of the rear wheel WR are covered with the left trunk 23 and the right trunk 24. The center trunk 22 includes as main components a trunk box main body 25 and a trunk open-close lid 26 with which the trunk box main body 25 is covered. A seat back 27 of the passenger seat 19 is provided in front of the trunk open-close lid 26. A lower portion of the trunk box main body 25 is covered with a rear center cover 28 extending in the front-rear direction in a manner continuous with rear portions of the rear side covers 20L, 20R, and continuous with upper portions of the left trunk 23 and the right trunk 24.

Figure 3:
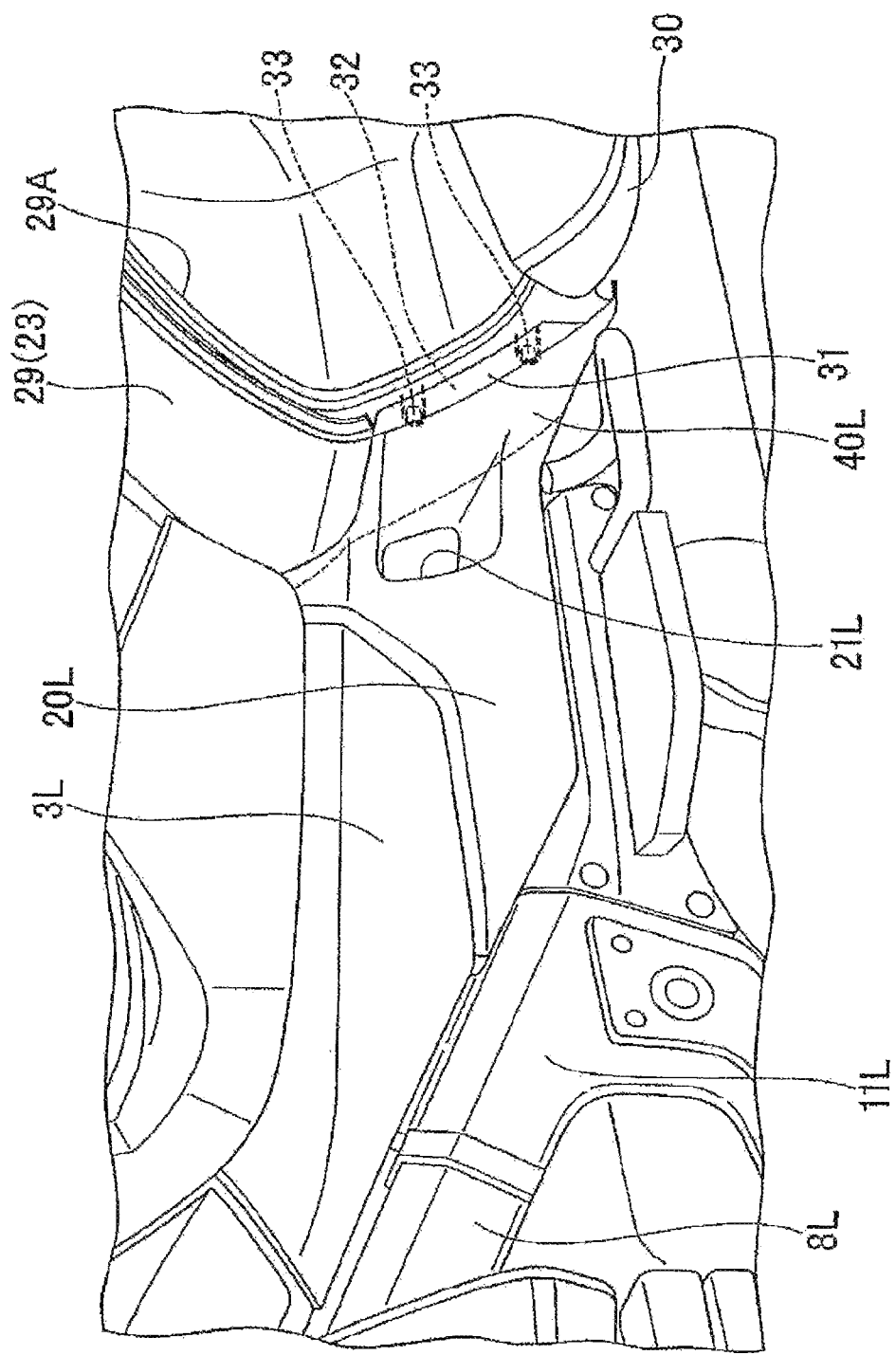
FIG. 3 is a perspective view of a vehicle rear part in which a trunk open-close lid is opened.
Figure 4:
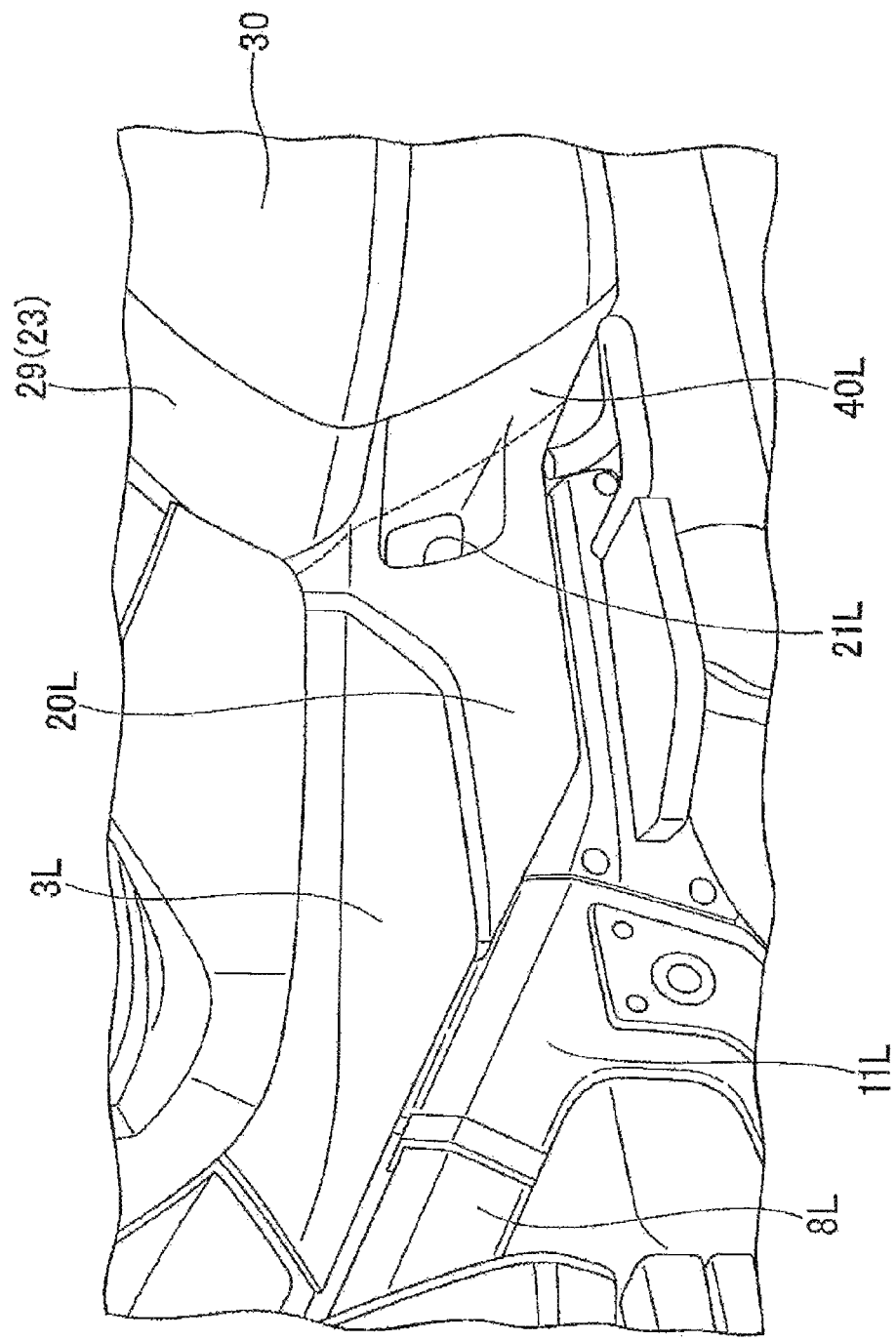
FIG. 4 is a perspective view of the vehicle rear part in which the trunk open-close lid is closed.

The left trunk 23 includes as main components a trunk box main body 29 (dashed line) and a trunk open-close lid 30 capable of opening and closing the trunk box main body 29. The trunk box main body 29 is attached and fixed to the lower pipes 15L, 15R of the rear vehicle body frame 6 shown in FIG. 1 by bolts or the like. As shown in FIGS. 3 and 4, the trunk box main body 29 is arranged with an opening 29A facing the outside of the vehicle. A lower portion of the trunk open-close lid 30 is turnably supported by the trunk box main body 29. The trunk open-close lid 30 opens to the outside of the vehicle to expose the opening 29A to the outside, and covers the opening 29A from the outside in the vehicle width direction. It should be noted that, the right trunk 24 provided on the right side below the center trunk 22 has the same structure.

Figure 5:
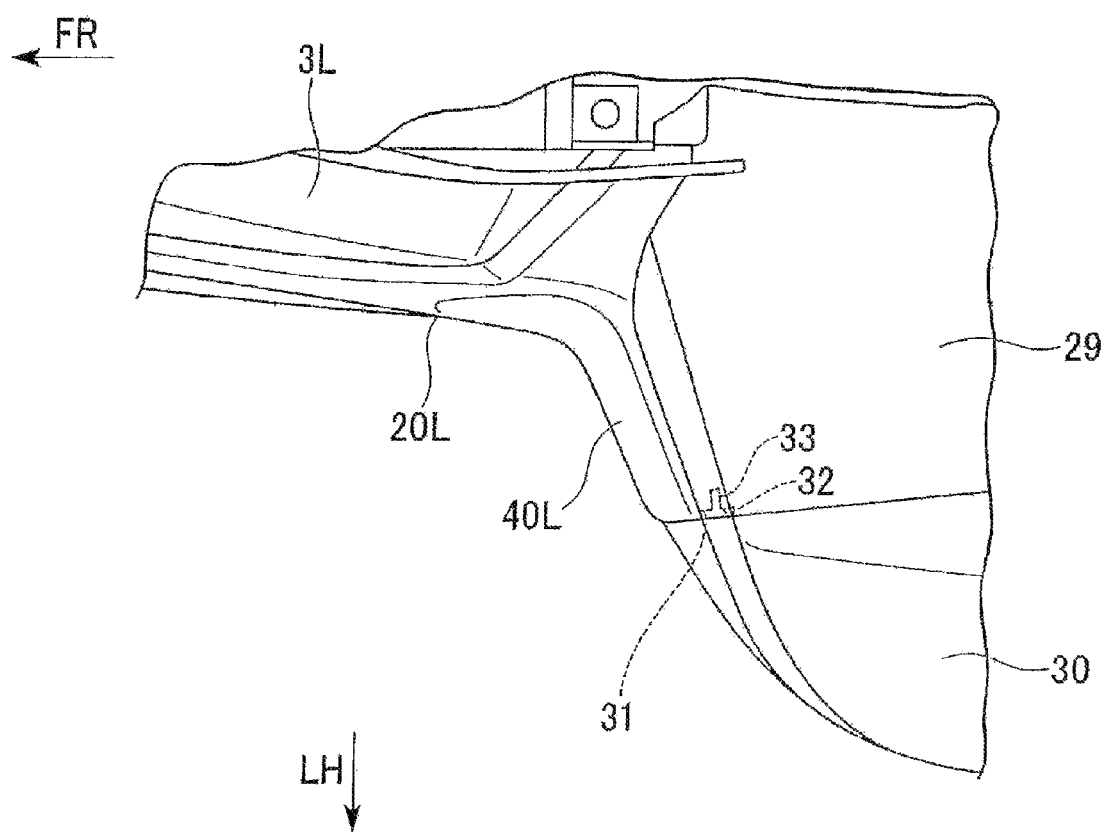
FIG. 5 is a top view of an area around a left trunk and a rear side cover.
Figure 6:
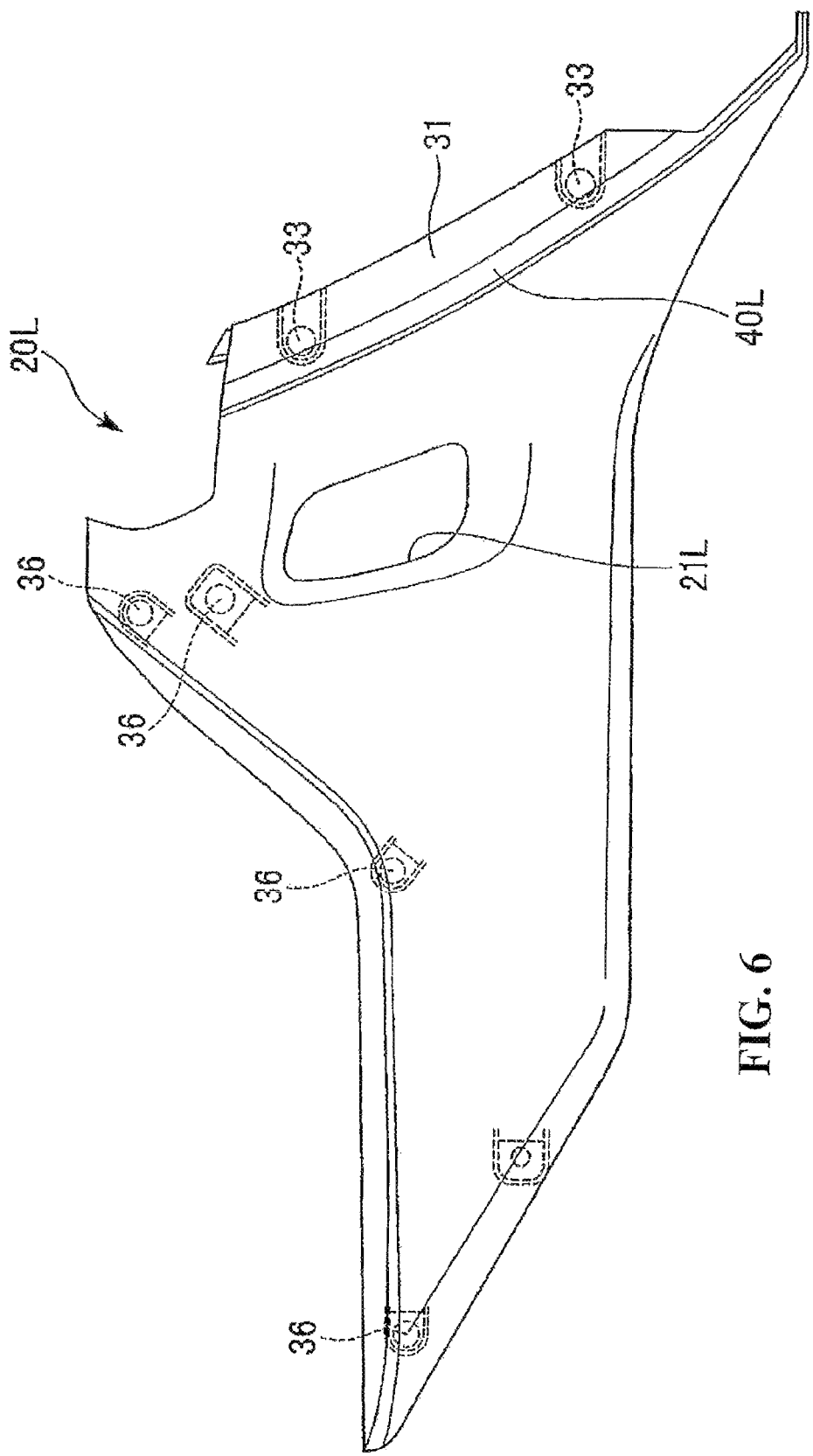
FIG. 6 is a side view of the rear side cover.
Figure 7:
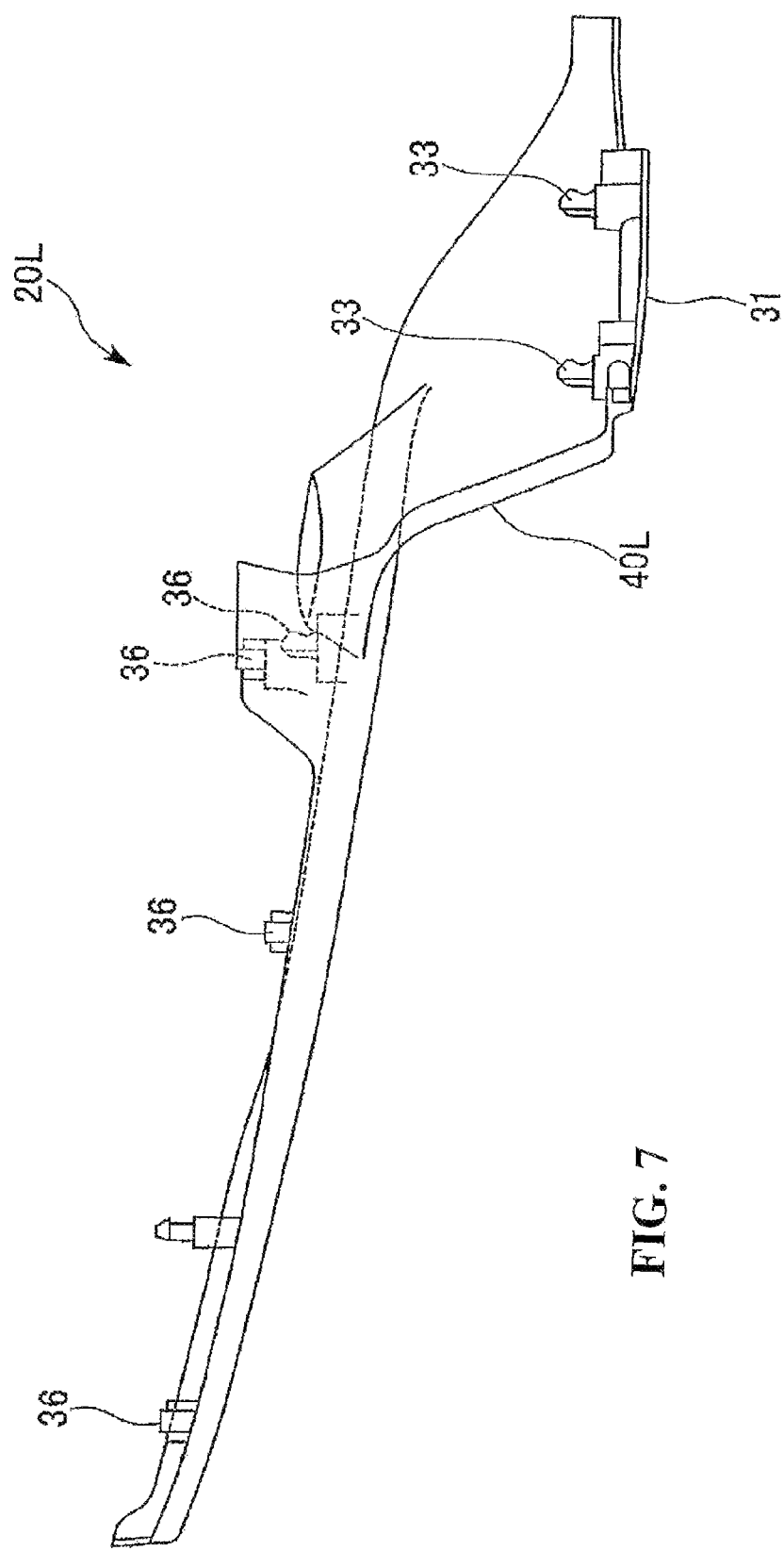
FIG. 7 is a top view of the rear side cover.

As understood with attention to FIGS. 3 to 5, a rear portion of the rear side cover 20L arranged in front of the trunk box main body 29 extends outward in the vehicle width direction along a front wall of the trunk box main body 29. In this way, an extension portion 40L along the front wall of the trunk box main body 29 is formed in the rear side cover 20L. The extension portion 40L extends to an outside edge portion (outermost outside surface) 32 of the trunk box main body 29 that is located in a front peripheral part of the opening 29A, as shown in FIG. 3. A rear edge portion 31 is formed in a side edge part of the extension portion 40L. The rear edge portion 31 extends in the front-rear direction along the outside edge portion 32 of the trunk box main body 29. As shown in FIGS. 6 and 7, boss portions 33, 33 are formed on an inner surface (the surface on an inner side of the vehicle body) of the rear edge portion 31 of the rear side cover 20L. The boss portions 33, 33 protrude from the inner surface and are arranged at an interval in the vertical direction.

Figure 8:
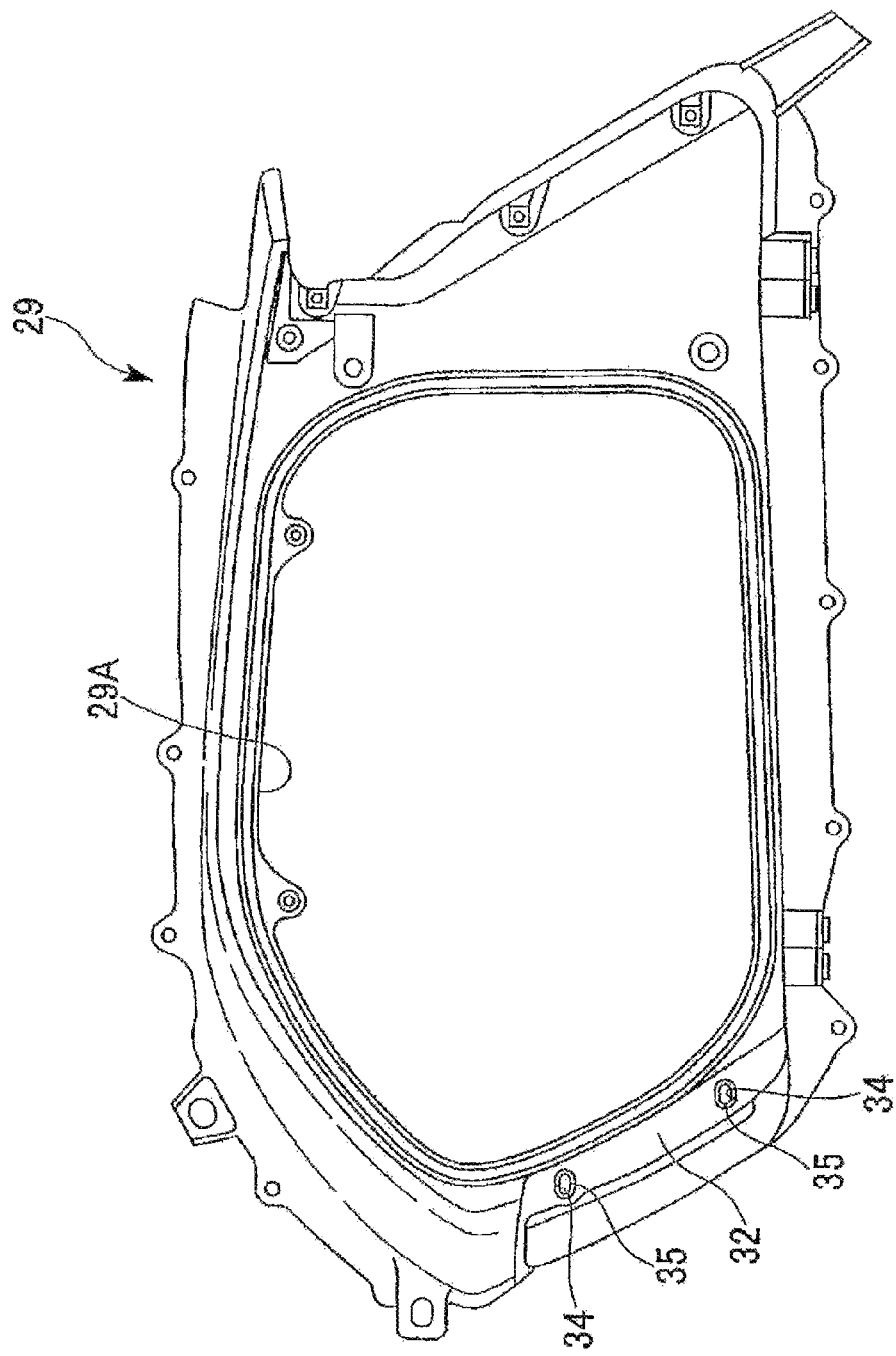
FIG. 8 is a side view of a trunk box main body.

The boss portions 33, 33 of the rear side cover 20L are fixed to the trunk box main body 29. As shown in FIG. 8, elongated holes 34, 34 are formed in the outside edge portion 32 of the trunk box main body 29, and are arranged at an interval in the vertical direction. A rear part of the rear side cover 20L is fixed by engaging the boss portions 33, 33 with the elongated holes 34, 34 from the outside toward the inside in the vehicle width direction. Here, the boss portions 33 are elastically supported by elongated-hole-shaped grommets 35 respectively provided to inner peripheries of the elongated holes 34 and made of a resin material.

With reference to FIGS. 3 and 4 together, fixing portions, where the rear edge portion 31 of the rear side cover 20L and the outside edge portion 32 of the trunk box main body 29 are fixed to each other, are covered with the trunk open-close lid 30 when the trunk open-close lid 30 is completely closed. In addition, with reference to FIGS. 6 and 7, boss portions 36, for assembling like the boss portions 33, 33, are formed on the front side and the center side of the inner surface of the rear side cover 20L. These boss portions 36 are engaged with engaging holes or the like formed in a lower part of the side vehicle body cover 3L. In this way, the rear side cover 20L is attached to lie between the side vehicle body cover 3L and the left trunk 23.

As has been described so far, the motorcycle 1 of this embodiment is provided with the left trunk 23 on the rear lateral side of the vehicle body frame 4. The left trunk 23 includes the trunk box main body 29 having the opening 29A facing the outside of the vehicle, and the trunk open-close lid 30 which is openable and closable to cover the opening 29A. The rear side cover 20L covering the lateral side of the vehicle body is arranged in front of the left trunk 23. The rear edge portion 31 of the rear side cover 20L extends to the outside edge portion 32 of the trunk box main body 29 and is fixed to the outside edge portion 32 of the trunk box main body 29. This fixation keeps the rear edge portion 31 of the rear side cover 20L from flapping. Thus, the rear side cover 20L and the left trunk 23 are prevented from hitting each other, and thereby are prevented from being damaged in texture.

In addition, the grommets 35, 35 shaped like elongated holes, having a length dimension in the front-rear direction of the vehicle, are provided to the outside edge portion 32 of the trunk box main body 29. The boss portions 33, 33 are provided on the inner surface of the rear edge portion 31 of the rear side cover 20L. The boss portions 33, 33 are engaged with the grommets 35, 35. Since the grommets 35 are elongated holes having a length dimension in the front-rear direction of the vehicle, the above structure can absorb positioning variations in the front-rear direction in assembling of the rear side cover 20L and the trunk box main body 29 together. In addition, in this embodiment, the side vehicle body cover 3L is provided in front of the rear side cover 20L, and the driver seat 18 on which a driver is to be seated is provided above the side vehicle body cover 3L. Even in this case where the rear side cover 20L is surrounded by two or more other components, the rear side cover 20L can absorb variations in the assembling of the other components.

Moreover, the fixing parts where the rear edge portion 31 of the rear side cover 20L and the outside edge portion 32 of the trunk box main body 29 are fixed to each other are covered with the trunk open-close lid 30 when the trunk open-close lid 30 is completely closed. This structure allows the rear edge portion 31 of the rear side cover 20L to be fixed with the trunk open-close lid 30 opened. The fixing part is hidden by closing the trunk open-close lid 30. Thus, the workability and the appearance are improved. In addition, there is no concern that the rear side cover 20L may fall off during driving, because the motorcycle 1 does not usually start to run when the trunk open-close lid 30 is opened.

The boss portions 33, 33 of the rear side cover 20L are inserted into the grommets 35, 35 from the outside toward the inside in the vehicle width direction, and the rear edge portion 31 of the rear side cover 20L is covered with the trunk open-close lid 30 from the outside in the vehicle width direction. In this structure, since the boss portions 33, 33 are inserted from the outside toward the inside in the vehicle width direction, the fixing parts (including the grommets 35, 35 and the like) are not exposed to the outside even when not being covered with the trunk open-close lid 30. It should be noted that, the rear side cover 20R attached to the right side of the vehicle has the same structure as the aforementioned structure of the rear side cover 20L, although the description thereof is omitted herein.

The structure in the above embodiment is an example of the present invention. It is obvious that composition, structures, shapes, sizes, numbers, layout and the like of components can be modified in various ways without departing from the spirit of the present invention. For example, the present invention is applied to a motorcycle in the above embodiment, but can be preferably applied to other types of vehicles such as tricycles and four-wheel buggies.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cover structure of a saddle ride type vehicle, comprising:
   a storage box provided on a lateral side of a vehicle frame on a rear side of the vehicle, the storage box including a storage box main body having an opening facing an outside of the vehicle, and a lid member configured to be openable and closable to cover the opening; and
   a side cover provided in front of the storage box, and configured to cover a vehicle body lateral side,
   wherein a rear edge portion of the side cover extends to an outermost outside surface of the storage box main body, and the rear edge portion of the side cover is fixed to the outermost outside surface of the storage box main body, and
   wherein an elongated hole grommet, having a length dimension in a front-rear direction of the vehicle, is provided in the outermost outside surface of the storage box main body, a boss portion is provided on an inner surface of the rear edge portion of the side cover, and the boss portion is engaged with the grommet.

2. The cover structure of a saddle ride type vehicle according to claim 1, wherein a fixing part, in which the rear edge portion of the side cover is fixed to the outermost outside surface of the storage box main body, is covered with the lid member when the lid member is completely closed.

3. The cover structure of a saddle ride type vehicle according to claim 1, wherein a front side cover is provided in front of the side cover, and a driver seat is provided above the front side cover.

4. The cover structure of a saddle ride type vehicle according to claim 1, wherein the boss portion of the side cover is inserted into the grommet from the outside to an inside in a vehicle width direction, and the rear edge portion of the side cover is covered with the lid member from the outside in the vehicle width direction.

5. The cover structure of a saddle type vehicle according to claim 1, wherein a rear portion of the rear side cover includes an extension portion that extends outward in the vehicle width direction along a front wall of the storage box main body, the extension portion extends to a portion of the outermost outside surface of the storage box main body that is located in a front peripheral part of the opening of the storage box main body, and the rear edge portion of the side cover is formed in a side edge part of the extension portion.

6. The cover structure of a saddle type vehicle according to claim 5, wherein boss portions are formed on an inner surface of the rear edge portion of the side cover, the boss portions protrude from the inner surface and are arranged at an interval in the vertical direction, elongated hole grommets are formed in the outermost outside surface of the storage box main body, and the boss portions are received in the elongated hole grommets.

7. The cover structure of a saddle ride type vehicle according to claim 6, wherein the boss portions are inserted into the grommets from the outside to an inside in a vehicle width direction, and the rear edge portion of the side cover is covered with the lid member from the outside in the vehicle width direction.

8. A cover structure of a saddle ride type vehicle, comprising:
a storage box provided on a rear side of the vehicle, the storage box including an opening and a lid member configured to open and close the opening; and
a side cover provided in front of the storage box,
wherein a rear edge portion of the side cover is fixed to an outermost outside surface of the storage box, and
wherein a rear portion of the rear side cover includes an extension portion that extends outward in the vehicle width direction along a front wall of the storage box, the extension portion extends to a portion of the outermost outside surface of the storage box that is located in a front peripheral part of the opening of the storage box, and the rear edge portion of the side cover is formed in a side edge part of the extension portion.

9. The cover structure of a saddle ride type vehicle according to claim 8, wherein an elongated hole grommet, having a length dimension in a front-rear direction of the vehicle, is provided in the outermost outside surface of the storage box, a boss portion is provided on an inner surface of the rear edge portion of the side cover, and the boss portion is engaged with the grommet.

10. The cover structure of a saddle ride type vehicle according to claim 8, wherein a fixing part, in which the rear edge portion of the side cover is fixed to the outermost outside surface of the storage box, is covered with the lid member when the lid member is completely closed.

11. The cover structure of a saddle ride type vehicle according to claim 9, wherein a front side cover is provided in front of the side cover, and a driver seat is provided above the front side cover.

12. The cover structure of a saddle ride type vehicle according to claim 9, wherein the boss portion of the side cover is inserted into the grommet from the outside to an inside in a vehicle width direction, and the rear edge portion of the side cover is covered with the lid member from the outside in the vehicle width direction.

13. The cover structure of a saddle type vehicle according to claim 8, wherein boss portions are formed on an inner surface of the rear edge portion of the side cover, the boss portions protrude from the inner surface and are arranged at an interval in the vertical direction, elongated hole grommets are formed in the outermost outside surface of the storage box, and the boss portions are received in the elongated hole grommets.

14. The cover structure of a saddle ride type vehicle according to claim 13, wherein the boss portions are inserted into the grommets from the outside to an inside in a vehicle width direction, and the rear edge portion of the side cover is covered with the lid member from the outside in the vehicle width direction.

15. A saddle ride type vehicle, comprising:
a storage box mounted on a rear of the vehicle, the storage box including an opening and a lid member configured to open and close the opening; and
a side cover mounted to the vehicle in front of the storage box,
wherein a rear portion of the side cover is fixed to a front of the storage box adjacent the opening, and the rear portion is covered by the lid when the lid is in a closed position.

16. The saddle ride type vehicle according to claim 15, wherein boss portions are formed on an inner surface of the rear portion of the side cover, the boss portions protrude from the inner surface and are arranged at an interval in the vertical direction, elongated holes are formed in the front of the storage box, and the boss portions are received in the elongated holes.

* * * * *